Nov. 4, 1958 J. J. O'NEILL, JR 2,859,019
STIRRING DEVICE
Filed April 27, 1956

INVENTOR:
JOHN J. O'NEILL JR.
ATTORNEYS.

United States Patent Office 2,859,019
Patented Nov. 4, 1958

2,859,019

STIRRING DEVICE

John J. O'Neill, Jr., Alton, Ill., assignor to Olin Mathieson Chemical Corporation, East Alton, Ill., a corporation of Virginia Application April 27, 1956, Serial No. 581,124

6 Claims. (Cl. 259—107)

This invention relates to a stirring device and more specifically to a stirring device which automatically maintains itself at a predetermined depth as the level of a fluid in which it is immersed changes.

Many processes require that a liquid be stirred to prevent separation of the liquid. When a vessel is being filled or drained the level of the liquid is constantly changing and a fixed level stirring device is ineffective to properly stir the liquid because the level of the liquid first approaches, then moves through and finally passes beyond a fixed level stirrer. Thus the degree of stirring is not constant. In handling many liquids it is desirable to maintain a constant motion in the surface of the liquid and a fixed level stirrer is ineffective accomplishing this function while filling and draining a vessel since such a fixed stirrer would be positioned at the normal filled level of the surface of the liquid in the vessel.

It is therefore an object of this invention to provide a stirrer which will automatically maintain itself at any desired level in a liquid.

Another object of this invention is to provide a stirrer which will maintain any desired position in a liquid relative to the surface of the liquid as the depth of the liquid changes in a vessel.

Additional objects and advantages will be apparent from the following description and drawings in which.

In order to maintain the proper stirring of a liquid as it is poured into or drained from a vessel a stirrer is slidably and non-rotatably mounted on an oscillating or rotating vertical shaft extending into the vessel. The stirring device is provided with a buoyant member, which floats on the surface of the liquid, and with stirring blades, both of which are attached to a hub. When the vessel is empty the stirrer and buoyant member will be positioned in the bottom of the vessel. As a liquid is poured into the vessel the buoyant member floats on the surface of the liquid and rises as the liquid level rises in the vessel. If it is desired to stir the surface of the liquid, blades are attached directly to the buoyant member hub or if it is desired to stir only the body of the liquid, blades are attached to a hub which is slidably and non-rotatably received on the shaft and are connected to the buoyant member by chains or other appropriate means. Thus as the liquid is poured into the vessel the buoyant member will float on the surface and as the liquid level increases the chains will lift the stirring blades and maintain the blades at a given depth below the surface of the liquid. The blades may move with either an oscillating or rotary motion in the liquid, as dictated by the requirements of the treatment the liquid is undergoing.

Figure 1:
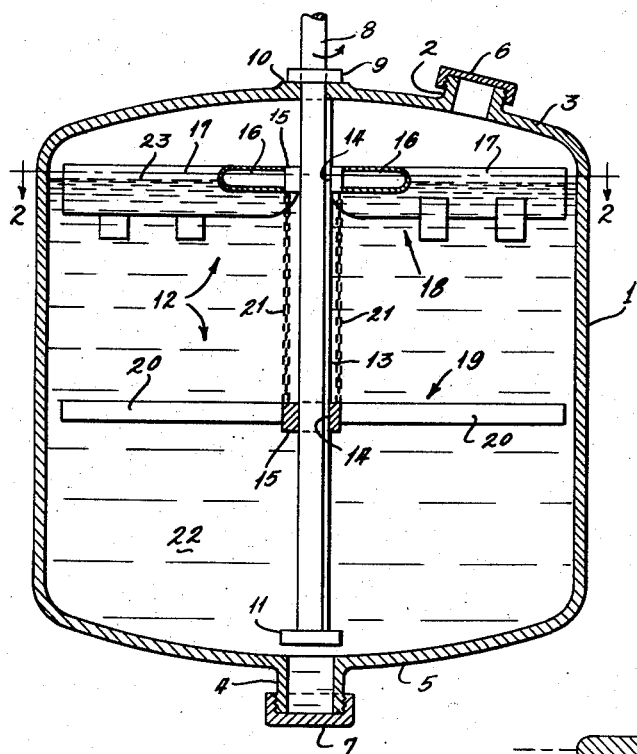
Figure 1 is a vertical sectional view showing a vessel and an embodiment of a stirrer.

Referring to Figure 1 a vessel 1 has a liquid inlet 2 in its top portion 3 and a liquid outlet 4 in its bottom portion 5. Both the inlet 2 and outlet 4 may be closed in any appropriate means as by threaded caps 6 and 7. A vertical shaft 8 is supported from above as by a collar 9 on the shaft supported on a bearing surface 10 on the top 3 of the vessel 1 and projects into the vessel to a point just above the bottom 5 of the vessel. The bottom end of the shaft has affixed thereto a supporting member 11.

A stirring assembly 12 is slidably and non-rotatably mounted on the shaft 8. The shaft has a longitudinal outwardly projecting rib 13 which is received in slots 14 in hubs 15 to prevent rotation of the hub. Affixed to the top hub 15 are a hollow buoyant member 16 and a pair of stirring paddles 17. Immediately below the first stirring paddle assembly 18 is a second stirring paddle assembly 19 having paddles 20 attached to the lower hub 15. The lower stirring assembly 19 is not provided with a buoyant chamber and is supported in the liquid by chains 21 attached to the upper stirring paddle assembly hub 15. The buoyant chamber 16 of the upper assembly 18 supports both the upper assembly 18 and the lower assembly 19. The buoyant chamber 16 is hollow and may be fabricated out of metal, plastic or any other suitable material which is unaffected by the liquid 22 and the process.

As shown in Figure 1 the vessel 1 is filled with the liquid 22 and the upper blade assembly 18 including buoyant chamber 16 are floating on the surface 23 of the liquid with the lower assembly 19 suspended in the liquid by the chains 21. As the liquid 22 is drained from the vessel through the outlet 4 the buoyant chamber 16 will always remain at the surface 23 of the liquid 22 and will move downwardly as the liquid level drops. The lower blade assembly 19 will also move downwardly as the level drops until it rests against the support member 11 at the lower end of the shaft 8. Thereafter as the liquid level continues to drop the upper blade assembly 18 including the buoyant chamber 16 will continue to move downwardly until it is resting on the top of the lower blade assembly 20. All the blades as 17 and 19 will continue to turn as long as the shaft 8 turns because the hubs 15 are keyed to the shaft by rib 13 throughout the length of the shaft 8.

Figure 3:
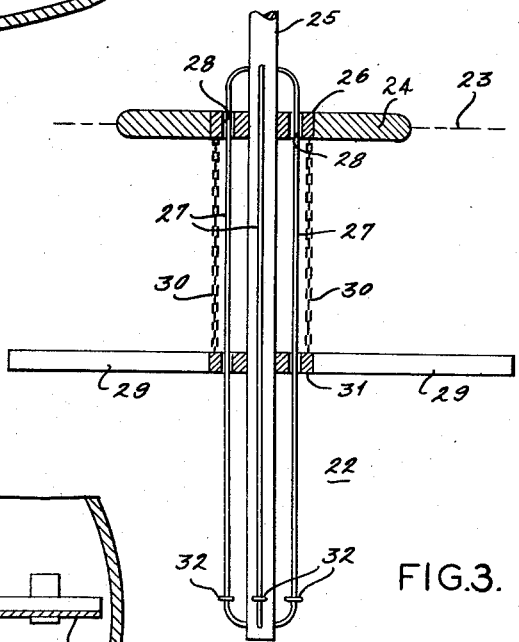
Figure 3 shows a modified form of the stirrer shown in Figure 1.
Figure 2:
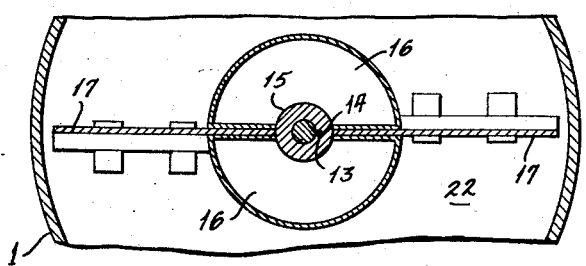
Figure 2 is a sectional view of the stirrer taken on the line 2—2 in Figure 1.

Figure 3 shows a modified form of a stirrer in which the buoyant chamber 16 shown in Figure 1 is replaced by a buoyant block 24 which may be wood, plastic or the like that will float on the liquid 22 and is not adversely affected by the process or liquid. The block 24 is attached to a shaft 25 by a hub 26 which is slidably and non-rotatably mounted on the shaft. Rather than providing the shaft 25 and hub 26 with an interengaging rib and slots, as in Figure 1, in this modification U-shaped rods 27 are attached to the shaft 25 and the hub 26 is provided with holes 28 which slidably receive the rods. The stirrer of Figure 3 has no provision for stirring the surface 23 of the liquid. Stirring blades 29 are suspended in the liquid by chains 30 connecting a blade hub 31 and the buoyant block hub 26. The lower ends of the rods 27 are provided with support members 32 which support the blades 29 and the buoyant block 24 as the level of the liquid 22 is lowered.

Any number of submerged suspended blade assemblies may be provided in a vessel either with or without surface stirring blades. The buoyant chamber and buoyant block are interchangeable in Figures 1 and 3. Many types of blade assemblies may be substituted for the paddle type blades shown in the drawings. For example, turbine, propeller or serrated disk type blades may be used in place of the paddles shown. The vertical shaft may be supported in any conventional manner either by the vessel itself as shown or by a separate support position above the vessel. Alternatively, the shaft may extend entirely through the vessel in which event it may be supported below the vessel or if desired, the bottom of the shaft may be supported by the inner bottom wall of the vessel.

Although certain specific embodiments and details have been described in the foregoing specification various modifications thereof will be apparent to one skilled in the art and the invention is therefore not to be limited to such specific embodiments and details except as set forth in the appended claims.

1. In a stirring device the combination of means to contain a liquid, a vertical shaft positioned within said means and rotatable about a longitudinal axis, a buoyant member and a stirring member, means mounting said members on said shaft for longitudinally sliding motion on said shaft and for rotation of said members with said shaft, said stirring member resting in the bottom of said containing means until a predetermined depth of fluid is in said containing means, and means interconnecting said buoyant member and said stirring member to lift said stirring member from the bottom of said containing means and to position said stirring member at a predetermined location with respect to said buoyant member as the depth of the liquid in said containing means increases.

2. In a stirring device the combination of means to contain a liquid, a vertical shaft positioned within said means and rotatable about its longitudinal axis, a hub slidably mounted on said shaft, means mounting said hub on said shaft for rotation with said shaft, a buoyant member attached to said hub, means to stir a liquid in said containing means, means interconnecting said buoyant member and said stirring means in fixed lateral relationship and means to position said stirring member at a predetermined location with respect to said buoyant member after the surface of a liquid in said containing means rises a predetermined amount.

3. A stirring device comprising a vessel adapted to contain a liquid, a vertical shaft in said vessel extending substantially from the top to the bottom of said vessel, a buoyant member slidably mounted on said shaft and adapted to float on the surface of a liquid contained in said vessel, a stirring blade secured to said buoyant member and positioned to stir the surface of said liquid, a second stirring blade slidably mounted on said shaft independently of said buoyant member, means to rotate said second stirring blade with said shaft, and means interconnecting said second blade and said buoyant member to position said second blade at a given distance from the surface of said liquid only after a predetermined depth of liquid is in said vessel and to maintain said spacing as the surface of said liquid rises above or falls to the initial level of said predetermined depth of liquid in said vessel.

4. The stirring device of claim 3 wherein the first stirring blade is vertically fixed relative to said buoyant member.

5. The stirring device of claim 3 wherein said means comprises a flexible member and wherein said second blade is thereby suspended below said buoyant member.

6. The stirring device of claim 5 wherein said first blade is vertically fixed relative to said buoyant member.

References Cited in the file of this patent

UNITED STATES PATENTS 1,756,318    Voss _____ Apr. 29, 1930